United States Patent
Nolin

(10) Patent No.: US 10,578,335 B2
(45) Date of Patent: Mar. 3, 2020

(54) INSULATED AIR TRANSFER DUCT

(71) Applicant: Daniel Frank Nolin, Grande Pointe (CA)

(72) Inventor: Daniel Frank Nolin, Grande Pointe (CA)

( * ) Notice: Subject to any disclaimer, the term of this patent is extended or adjusted under 35 U.S.C. 154(b) by 0 days.

(21) Appl. No.: 15/944,985

(22) Filed: Apr. 4, 2018

(65) Prior Publication Data

US 2019/0309981 A1 Oct. 10, 2019

(51) Int. Cl.
*F16L 13/02* (2006.01)
*F24F 13/02* (2006.01)
*F16L 59/02* (2006.01)

(52) U.S. Cl.
CPC .......... *F24F 13/0263* (2013.01); *F16L 59/02* (2013.01); *F24F 13/0245* (2013.01); *F24F 13/0281* (2013.01)

(58) Field of Classification Search
CPC ............... F24F 13/0263; F24F 13/0245; F24F 13/0281; F16L 59/02
USPC .................................................. 138/149, 164
See application file for complete search history.

(56) References Cited

U.S. PATENT DOCUMENTS

| | | | | |
|---|---|---|---|---|
| 3,889,581 A | * | 6/1975 | Bray, Sr. | F16L 23/14 126/299 E |
| 4,183,379 A | * | 1/1980 | Marquette | F16L 9/003 138/149 |
| 8,186,387 B2 | * | 5/2012 | Wadsworth | F16L 55/0336 138/143 |
| 8,667,995 B1 | * | 3/2014 | Fanelli | F24F 13/0245 138/112 |
| 2001/0003993 A1 | * | 6/2001 | Faverio, IV | F16L 59/147 138/149 |
| 2003/0051764 A1 | * | 3/2003 | Jungers | B29C 41/04 138/149 |
| 2003/0236043 A1 | * | 12/2003 | Calzavara | B32B 15/14 442/79 |
| 2006/0054235 A1 | * | 3/2006 | Cohen | B32B 15/08 138/149 |
| 2006/0096652 A1 | * | 5/2006 | Navarro Niedercorn | F16L 59/04 138/149 |
| 2014/0261846 A1 | * | 9/2014 | Lanciaux | B29D 23/001 138/141 |
| 2015/0101697 A1 | * | 4/2015 | Duffy | F24F 13/0209 138/149 |
| 2016/0025371 A1 | * | 1/2016 | Parks | F16L 59/026 138/141 |

* cited by examiner

*Primary Examiner* — Craig M Schneider
*Assistant Examiner* — David R Deal
(74) *Attorney, Agent, or Firm* — Adrian D. Battison; Ade & Company Inc.; Michael R. Williams

(57) ABSTRACT

An air duct transporting air between an interior location within a building and an air management system exterior to the building where the duct includes a metal duct wall with a layer of rigid insulation material surrounding at least the exterior part of the metal duct wall and carrying an outer foil layer. A covering material surrounds the rigid insulation, the covering material comprising a self-adhesive polyester layer bonded to the exterior surface of the rigid insulation.

16 Claims, 4 Drawing Sheets

INSULATED AIR TRANSFER DUCT

This invention relates to an insulated air transfer duct and particularly to a covering material which fully protects the insulation material.

BACKGROUND OF THE INVENTION

Exterior ducts for transfer of air between an interior location within a building and an air management system exterior to the building, the duct typically comprise a metal duct wall defining a hollow interior through which the air passes between the interior location and the air management system with at least part of the metal duct wall exterior to the building and thus subject to the exterior environment. In order to reduce heat loss a layer of rigid insulation material surrounds at least the exterior part of the metal duct wall. This is particularly important in locations where extreme temperature differences are possible but is advantageous everwhere.

Existing alternatives for covering and protecting the insulation material are as follows.

A layer of glass fiber and mastic (tar) is applied. This is a very old technique for outdoor ventilation insulation protection. Insulation is applied, followed by a layer of mastic (tar) troweled on to the insulation, followed by a glass fiber mesh applied/embedded to the mastic followed by a final layer trowel coat of mastic. This application is still being used to date. It is plagued with leaks from the date of installation, and has no ultraviolet/ozone resistance. It is a very messy application with a very unappealing appearance.

An aluminum Jacket is applied. This is another very old technique for outdoor ventilation insulation protection. Insulation is applied, then an aluminum or stainless steel clad finish is applied over the insulation. Years ago the cladding would be bent and manipulated to fit with sheet metal equipment onsite. Each piece of cladding would then be joined together with screws or rivets and sealed with a bead of silicone caulking.

Over the years the fabrication equipment is no longer onsite and now the cladding is being applied flat to all the 4 sides and affixed to the insulation with foil tape. The four sides (corners) of the cladded ducting now has matching corner beading applied and fastened with screws all around, followed by a bead of silicone caulking applied to all the joints. The joints break open over time causing leaks, the screw holes are never sealed causing seepage of water from the date of installation. The aluminum also dents from maintenance workers and hail.

This is the last alternative is sold under the trademark Ventureclad. This is essentially a 2 feet wide roll of foil self-adhesive tape. It is a peel & stick application. This product is made to look like the aluminum jacket. Companies often quote aluminum but on site substitute this product because the appearance is somewhat the same. This product is supposed to be applied with an overlap and simply rubbing it down with a plastic applicator supplied with the product. Because of the little holes that would be visible on the top side of the ventilation ducts from the edges unsticking over time. The mechanical insulators would simply apply a bead of aluminum (silver) caulking to all the joints. The manufacturer does not ask for this to be done. The trade's people do it to minimize call backs.

The other problems with this product is that birds (crows/ravens) will peck holes threw the product. It also shows hail damage easily and can be damaged by maintenance workers. Also because the duct installers seldom seal the ventilation ducts 100%, the leaking air from the duct acts to create a ballooning effect on the product which looks totally unsightly and causes it to pull away from the insulation layer underneath.

SUMMARY OF THE INVENTION

According to the invention there is provided an air duct transporting air between an interior location within a building and an air management system exterior to the building, the duct comprising:

a metal duct wall defining a hollow interior through which the air passes between the interior location and the air management system with at least part of the metal duct wall subject to an environment of extreme temperature difference and/or extreme humidity;

a layer of rigid insulation material surrounding at least the exterior part of the metal duct wall;

and a covering material surrounding the rigid insulation, the covering material comprising a self-adhesive plastics layer bonded to an exterior surface of the rigid insulation.

Preferably the thickness of the plastics layer is less than 1.5 mm or 0.060 inch and more preferably of the order of 1.2 mm or 0.045 inch or of the order of 0.9 mm or 0.035 inch. These thicknesses have been found to allow the material to wrap around square corners of a rectangular duct while remaining attached toe h exterior foil layer of the insulation on either side of the corner.

Preferably the plastics layer comprises a polyester such as PET and comprises a laminate of polyester including an intermediate layer of fibers forming a reinforced continuous polyester fibre arranged in a grid or in a mat sandwiched between two sheets of flexible matrix.

Preferably the plastics layer has a coating of adhesive having a thickness of the order of 0.3 mm or 0.011 inch.

Preferably the rigid insulation material comprises a foil exterior layer onto which the plastics layer is bonded.

Preferably the insulation material is fastened to the duct by pins passing through the insulation material to the exterior surface.

Preferably the seams are heat bonded and/or the seams are coated with a set liquid material extending to each side of an exposed edge of the material at the seam.

The arrangement of the present invention is designed to protect exterior insulation applied to rooftop ventilation systems. It is a weather protection jacketing using thermoplastic polyolefin (TPO) technology.

TPO is a waterproof sheet membrane which consists of a reinforced continuous polyester fibre arranged in a grid or in a mat sandwiched between two sheets of flexible matrix, a kind of polymer waterproof material which is made of advanced processing technology. TPO membranes provide both the ethylene propylene diene rubber weather resistance, aging resistance and polypropylene weld ability. One of the properties of thermoplastic membranes is that the material temporarily changes from a semi-solid state when heated sufficiently, enabling the sheets that are overlapped to be fused together and return to a solid upon cooling. Thus, a monolithic, continuous sheet membrane is created.

Advantages of the present arrangement include:

a heat-welded technology for a continuous waterproof sheet membrane;

Easy peel and stick application

Weather resistant

Anti-aging resistant

Anti-ultraviolet, ozone resistant

High puncture & impact resistant. (excellent tear resistant)

Inherently fire resistant.

Water resistant

Low temperature resistant (remains flexible at low temperatures)

High temperature resistant

Resistance to solvents, oils, acids, and detergents.

Resistant to bacteria & fungus/mold growth.

Easy to bend and manipulate around "inside/outside" corners and shapes.

Aesthetically appealing. (preferably white)

Provides excellent visual feedback of workmanship during and after installation.

The TPO waterproof membrane (PET surface) is polyester reinforced smooth with a peel and stick adhesive backing. The material is supplied in a roll size of 1.2 mm thickness (47.24 mil)×1 meter width×20 m length. The TPO comprises a waterproof membrane of 0.9 mm thickness or 35.43 mil with an adhesive layer of 0.3 mm sensitive pressure adhesive glue or 11.81 mil. The glue backing is peel Bitumen rubber glue.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
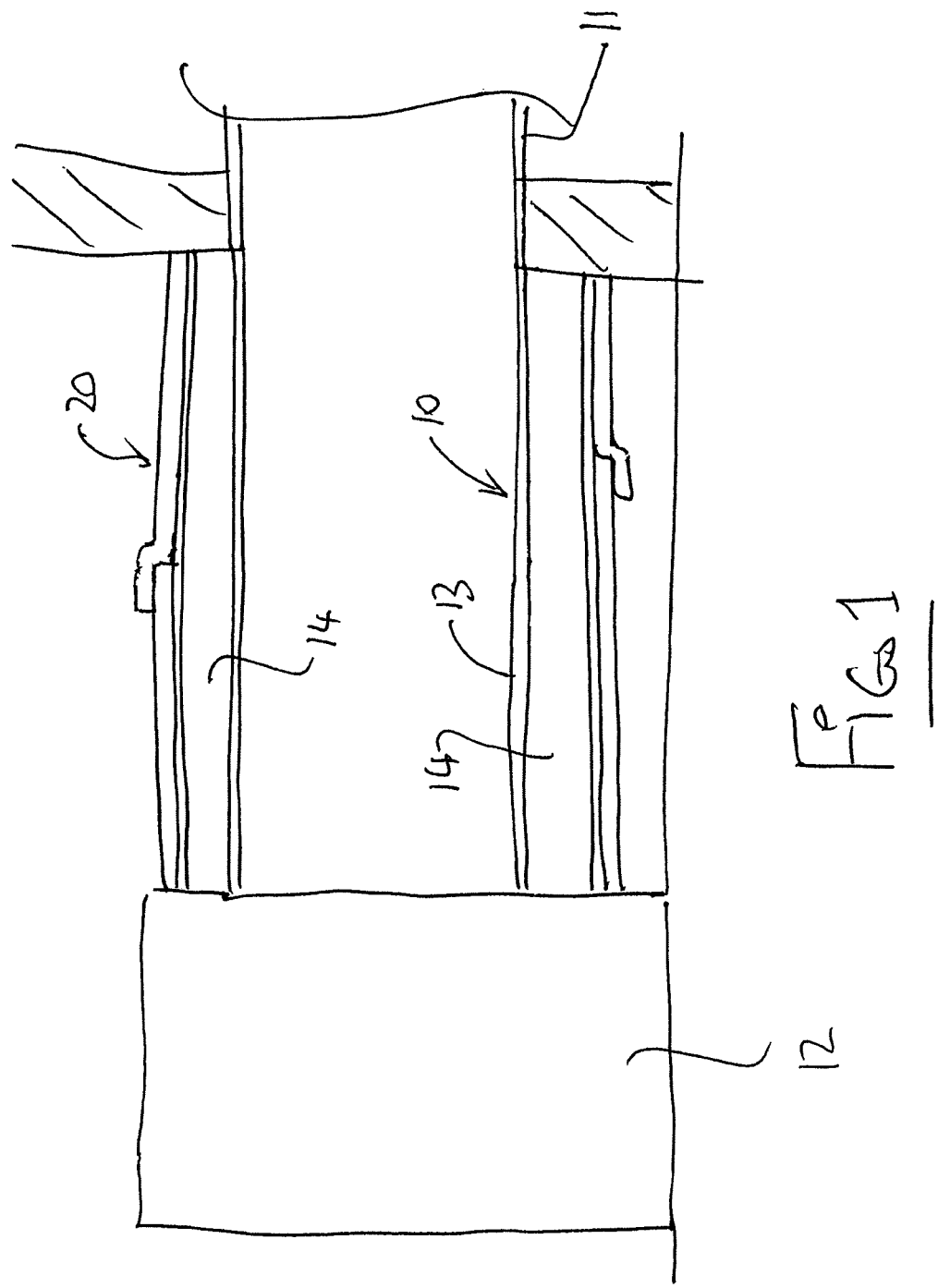
FIG. 1 is a longitudinal cross-sectional view of a duct according to the present invention.
Figure 2:
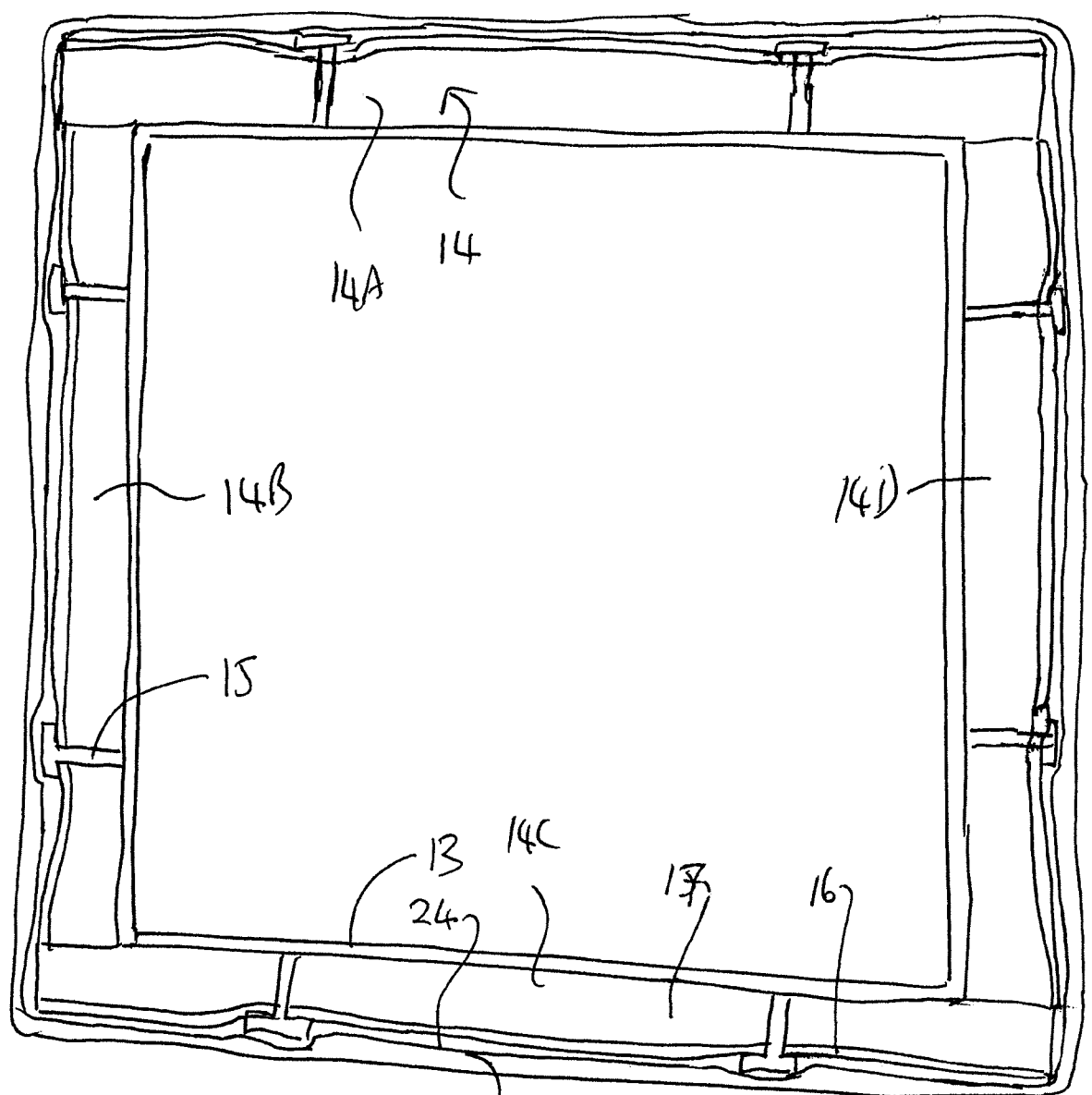
FIG. 2 is a transverse cross-sectional view of the duct of FIG. 1.
Figure 3:
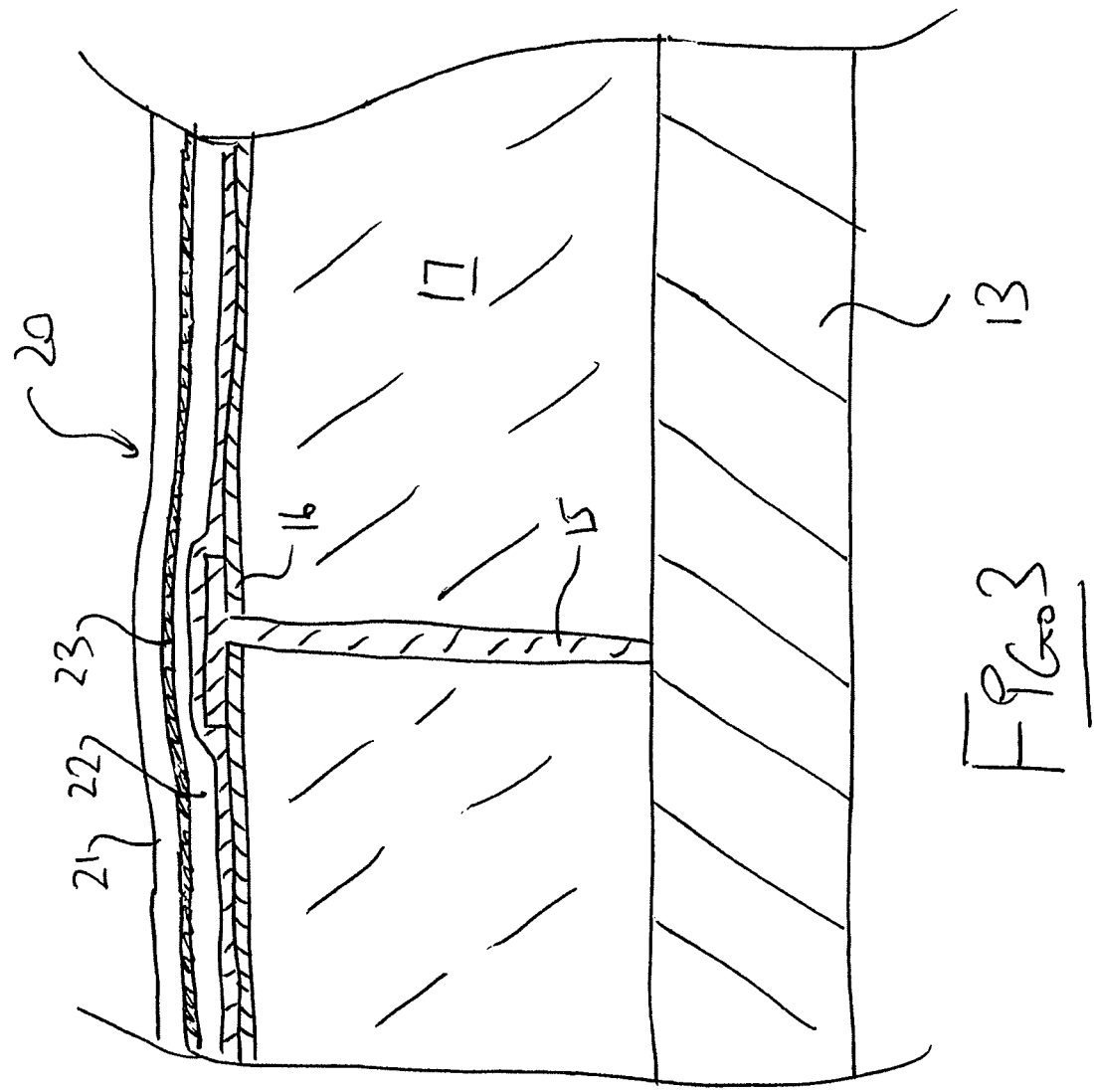
FIG. 3 is an enlarged view of the cross-section of FIG. 2.
Figure 4:
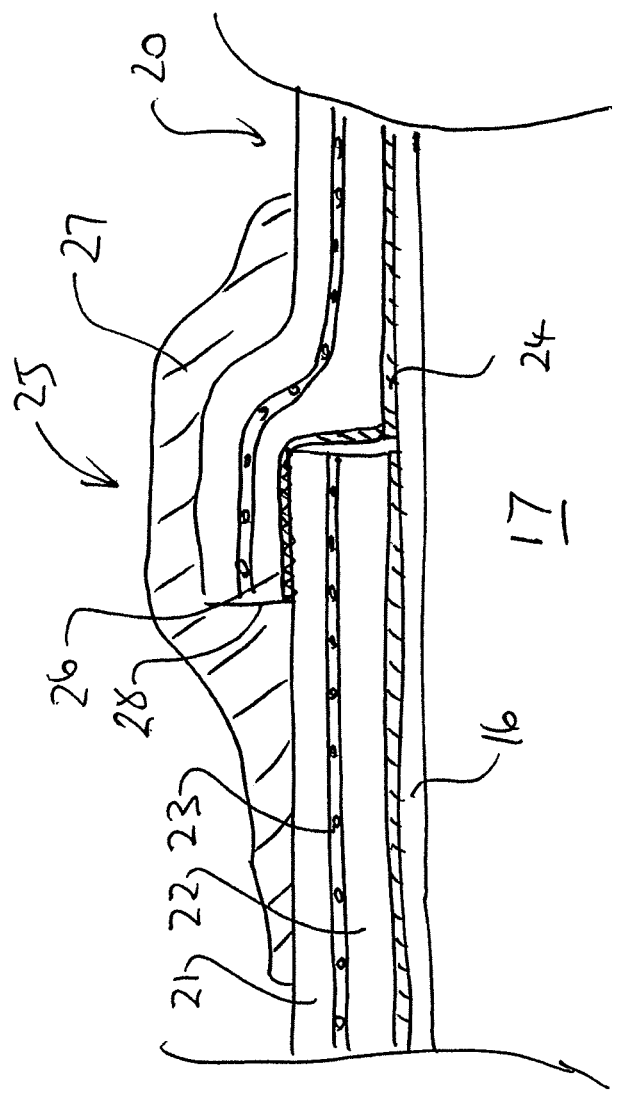
FIG. 4 is an enlarged cross-section through an overlap joint of the covering material of the duct of FIG. 1.

The air duct 10 of FIGS. 1 and 2 acts for transporting air between an interior location 11 within a building and an air management system 12 such as a heating, cooling or air exchange system exterior to the building.

The duct includes a metal duct wall defining a hollow interior through which the air passes between the interior location and the air management system. IN the embodiment shown the duct is square but other rectangular shapes or other cross-sections are possible including circular.

At least part of the metal duct wall is subject to an environment of extreme temperature difference and/or extreme humidity or weather as provided by the exterior or by high humidity locations.

A layer 14 of rigid insulation material surrounds the exterior part of the metal duct wall and is typically fabricated from stiff panels 14A, 14B, 14C and 14D which are cut to size to fit together to cover the outside surface of the duct. The insulation material is typically fastened to the duct by pins 15 passing through the insulation material to the exterior surface of the duct. The rigid insulation material comprises the stiff fibrous layer 17 and a foil exterior layer 16.

The outside surface of the insulating material is in the present invention covered by a covering material 20 wrapped so as to surround the rigid insulation. The covering material comprises a self-adhesive plastics layer 20 bonded to an exterior surface of the rigid insulation.

The covering layer 20 comprises a plastics layer which is a laminate of polyester layers 21 and 22 including an intermediate layer of fibers 23. The plastics layer has a coating of adhesive 24 which is pressure sensitive and is covered before application by a release sheet.

The covering material is wrapped round the duct with overlapped seams 25. The seams can be heat bonded as indicated at 26 and coated with a set liquid material 27 extending to each side of an exposed edge 28 of the material at the seam.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An air duct transporting air between an interior location within a building and an air management system exterior to the building, the duct comprising:

a metal duct wall defining a hollow interior through which the air passes between the interior location and the air management system with at least an exterior part of the metal duct wall subject to an environment of extreme temperature difference and/or extreme humidity;

a first sheet assembly surrounding at least the exterior part of the metal duct wall;

the first sheet assembly comprising a layer of rigid insulating material and an exterior covering foil layer laminated thereto;

the first sheet assembly being attached to the exterior part of the metal duct wall by pins which project through the exterior covering foil layer and the layer of rigid insulating material and attached to the metal duct wall to define exterior heads of the pins exterior to the foil layer;

and a covering material surrounding the first sheet assembly;

the covering material comprising a laminate of two layers of a plastics material including an intermediate layer of fibers;

the covering material being free from a foil layer;

the covering material being bonded to the exterior covering foil layer of the first sheet assembly by a self-adhesive material laminated to an inner surface of the covering layer so as to be carried thereby;

the covering material covering the heads of the pins.

2. The air duct according to claim 1 wherein a thickness of the covering material is less than 1.5 mm or 0.060 inch.

3. The air duct according to claim 1 wherein a thickness of the covering material is of the order of 1.2 mm or 0.045 inch.

4. The air duct according to claim 1 wherein a thickness of the pl covering material is of the order of 0.9 mm or 0.035 inch.

5. The air duct according to claim 1 wherein the plastics material of the covering material comprises a polyester.

6. The air duct according to claim 1 wherein the plastics material of the covering material comprises PET.

7. The air duct according to claim 1 wherein the intermediate layer of fibers of the covering material comprises continuous polyester fibre arranged in a grid or in a mat.

8. The air duct according to claim 1 wherein seams in the covering material are heat bonded and are coated with a set liquid material extending to each side of an exposed edge of the covering material at the seam.

9. An air duct transporting air between an interior location within a building and an air management system exterior to the building, the duct comprising:
- a metal duct wall defining a hollow interior through which the air passes between the interior location and the air management system with at least an exterior part of the metal duct wall subject to an environment of extreme temperature difference and/or extreme humidity;
- a first sheet assembly surrounding at least the exterior part of the metal duct wall;
- the first sheet assembly consisting of a layer of rigid insulating material and an exterior covering foil layer laminated thereto;
- the first sheet assembly being attached to the exterior part of the metal duct wall by pins which project through the exterior covering foil layer and the layer of rigid insulating material and attached to the metal duct wall to define exterior heads of the pins exterior to the foil layer;
- and a covering material surrounding the first sheet assembly;
- the covering material consisting of a laminate of two layers of a plastics material including an intermediate layer of fibers and an adhesive-material laminated to an inner surface of the covering layer so as to be carried thereby;
- the covering material being bonded to the exterior covering foil layer of the first sheet assembly by said adhesive material;
- the covering material covering the heads of the pins.

10. The air duct according to claim 9 wherein a thickness of the covering material is less than 1.5 mm or 0.060 inch.

11. The air duct according to claim 9 wherein a thickness of the covering material is of the order of 1.2 mm or 0.045 inch.

12. The air duct according to claim 9 wherein a thickness of the pl covering material is of the order of 0.9 mm or 0.035 inch.

13. The air duct according to claim 9 wherein the plastics material of the covering material comprises a polyester.

14. The air duct according to claim 9 wherein the plastics material of the covering material comprises PET.

15. The air duct according to claim 9 wherein the intermediate layer of fibers of the covering material comprises continuous polyester fibre arranged in a grid or in a mat.

16. The air duct according to claim 9 wherein seams in the covering material are heat bonded and are coated with a set liquid material extending to each side of an exposed edge of the covering material at the seam.

* * * * *